United States Patent [19]

Savidan

[11] Patent Number: 5,070,698

[45] Date of Patent: Dec. 10, 1991

[54] DUAL MASTER CYCLINDER WITH COMPENSATION VALVE

[75] Inventor: Henri Savidan, Luzarches, France

[73] Assignee: General Motors France, Gennevilliers, France

[21] Appl. No.: 572,181

[22] Filed: Aug. 24, 1990

[30] Foreign Application Priority Data

Sep. 14, 1989 [GB] United Kingdom ............... 8920874

[51] Int. Cl.⁵ .................. B60T 11/20; B60T 11/28
[52] U.S. Cl. ........................... 60/562; 60/589
[58] Field of Search ............. 60/533, 562, 585, 589, 60/588; 277/188 R, 188 A, 277, 251, 180; 251/334, 900

[56] References Cited

U.S. PATENT DOCUMENTS

| | | | |
|---|---|---|---|
| 4,492,082 | 1/1985 | Belart | 60/589 |
| 4,707,989 | 11/1987 | Nakamura et al. | 60/589 |
| 4,741.161 | 5/1988 | Belart et al. | 60/589 |
| 4,746,130 | 5/1988 | Abele | 277/235 R |
| 4,838,619 | 6/1989 | Ocvirk | 60/589 |
| 4,918,922 | 4/1990 | Nakano et al. | 60/589 |

FOREIGN PATENT DOCUMENTS

| | | | |
|---|---|---|---|
| 1430013 | 1/1966 | France | 251/334 |
| 1002251 | 8/1965 | United Kingdom . | |
| 1215055 | 12/1970 | United Kingdom . | |
| 2096279 | 10/1982 | United Kingdom | 251/334 |
| 2098294 | 11/1982 | United Kingdom . | |
| 2209198 | 5/1989 | United Kingdom . | |
| 2211567 | 7/1989 | United Kingdom . | |

OTHER PUBLICATIONS

UK Patent Office Serach Report AN 98920874.8 Jan. 3, 1990.

Primary Examiner—Edward K. Look
Assistant Examiner—Hoang Nguyen
Attorney, Agent, or Firm—Ernest E. Helms

[57] ABSTRACT

A dual master cylinder (10) for the braking system of a motor vehicle comprising a bore (18), a primary portion (12) and a secondary portion, in which the primary piston (16) comprises an outer piston (65) slidable in the bore (18), and a central piston (78) slidable in a piston bore (64) defined by the outer piston, the piston bore having a shoulder (72) engageable with an abutment face (98) on the central piston to define a check valve (62), the piston bore providing a fluid passage (70,96,68) between the high pressure chamber (30) and the low pressure chamber (22) of the primary portion, the check valve allowing hydraulic fluid to flow through the fluid passage during a rest mode or a release mode of the dual master cylinder, but preventing such flow during an apply mode. Prevents damage to elastomeric cup seal (26) when back pressure is generated by ABS due to the absence of a dilation port in the primary portion, which is no longer required due to the presence of the check valve.

12 Claims, 3 Drawing Sheets

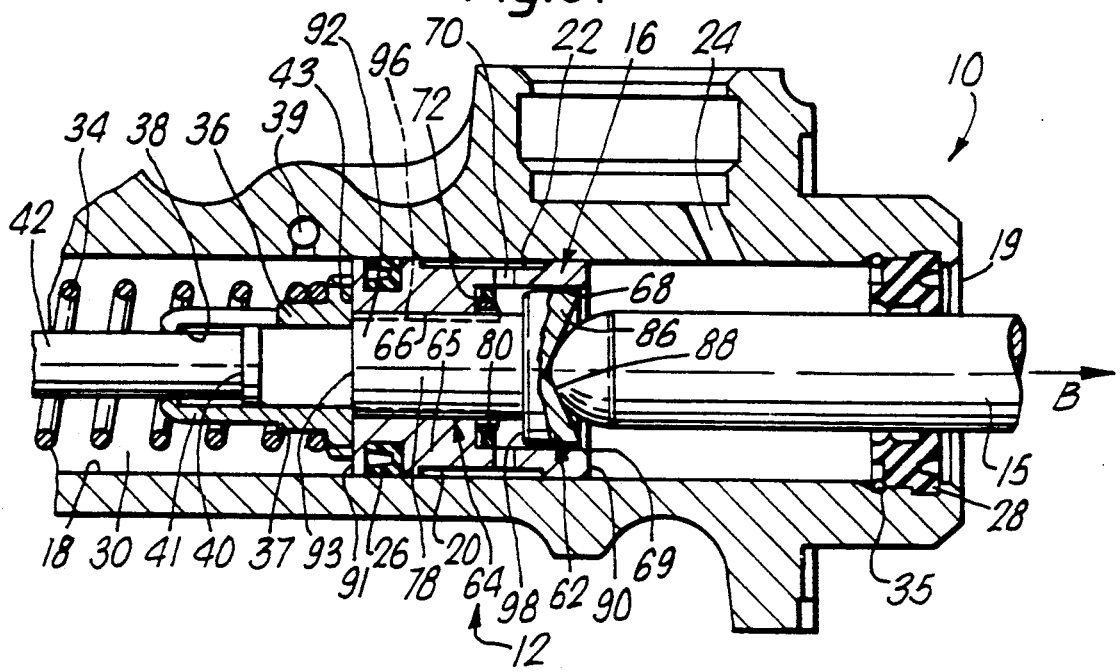
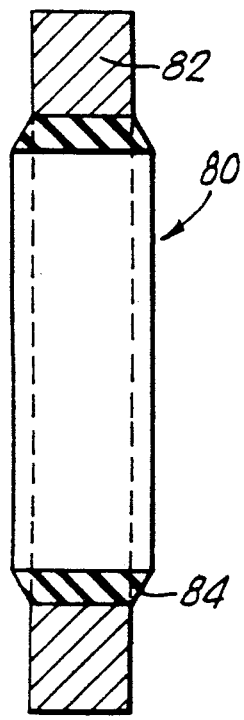
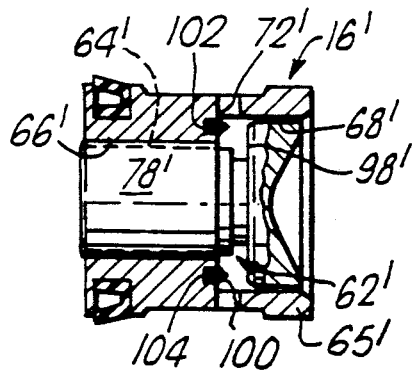
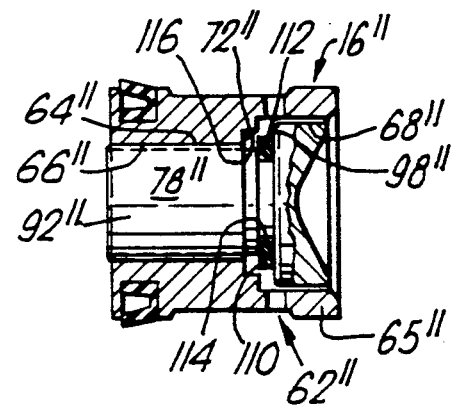

DUAL MASTER CYCLINDER WITH COMPENSATION VALVE

This invention relates to a dual master cylinder for the hydraulic braking system of a motor vehicle. Other dual master cylinders are shown in U.S. Ser. No. 391,930 and G-6623 Dual Master Cylinder and G-6635 Dual Master Cylinder with Compensation filed on even date herewith.

Dual master cylinders are well known, and comprise a primary portion and a secondary portion each comprising a low pressure chamber and a high pressure chamber. Each portion also comprises a piston, with the pistons being aligned. The primary piston and the secondary piston are slidably secured together such as to have a maximum relative separation. A primary spring is compressed between the primary piston and the secondary piston. A ring stop, engageable by the primary piston, retains the various components in the dual master cylinder. A secondary spring acts on the secondary piston to bias the pistons towards the ring stop. Each portion is supplied with hydraulic fluid to its low pressure chamber from a reservoir by way of a compensation port. Elastomeric cup seals mounted on the pistons allow passage of hydraulic fluid from the low pressure chambers to the high pressure chambers (but not flow in the reverse direction) to compensate for return movement of the piston and for brake pad or shoe wear. A dilation port connects each high pressure chamber to its respective reservoir to allow excess fluid (generated by thermal expansion, etc.) to flow back to its respective reservoir. The dilation ports are, necessarily, small to reduce the deadstroke of the dual master cylinder (that is, loss of stroke between brake pedal movement and pressure build up), and to reduce the risk of damaging the elastomeric cup seals as they pass over the dilation port opening during movement of the pistons. This arrangement is such that in usual circumstances, on brake pedal depression, the primary piston passes its associated dilation port to seal it from its associated high pressure chamber; the secondary piston then passes its associated dilation port; the fluid pressure in the high pressure chamber of the secondary portion then begins to increase; and then the fluid pressure in the high pressure chamber of the primary portion begins to rise. The use of a dual master cylinder in a motor vehicle provides two independent hydraulic circuits (a primary circuit and a secondary circuit integral with the primary portion and the secondary portion respectively) for the braking system. This ensures that the brakes can still be applied even in the event that one of the circuits should fail, such as due to a leakage of hydraulic fluid.

Whilst this known arrangement works satisfactorily on motor vehicles having a standard braking system, problems can arise on motor vehicles fitted with ABS (anti-lock braking systems), and in particular to back-pressure ABS in which hydraulic fluid can be pumped back to the high pressure chambers during operation of ABS. This action can result in very high fluid pressures being generated within the high pressure chambers. If, when ABS comes into operation, an elastomeric cup seal is positioned over a dilation port opening, the high pressure in the high pressure chamber can force the cup seal into the dilation port and damage it. In usual arrangements, the primary piston passes its corresponding dilation port before the secondary piston passes its corresponding dilation port on application of the vehicle brakes. During ABS operation, therefore, it is more likely that the elastomeric cup seal on the secondary piston could be damaged, rather than the cup seal on the primary piston. However, it is possible in certain circumstances for the elastomeric cup seal on the primary piston to be so damaged. Suitable alternative arrangements have been proposed, but these have tended to involve extending the length of the master cylinder.

It is an object of the present invention to overcome the above mentioned problem.

To this end, a dual master cylinder in accordance with the present invention comprises a bore having an open end and a closed end; a primary portion including a primary piston slidable in the bore, a low pressure chamber within the bore and defined by the shape of the primary piston, and a compensation port opening into the low pressure chamber and connectable with a primary fluid reservoir; and a secondary portion including a secondary piston slidable in the bore, a low pressure chamber within the bore and defined by the shape of the secondary piston, and a compensation port opening into the low pressure chamber and connectable with a secondary fluid reservoir; the primary portion including a high pressure chamber within the bore between the primary piston and the secondary piston, and the secondary portion including a high pressure chamber within the bore between the secondary piston and the closed end of the bore; a seal being mounted on the primary piston between the low and high pressure chambers of the primary portion; a seal being mounted on the secondary piston between the low and high pressure chambers of the secondary portion; the high pressure chamber of the secondary portion being fluidly connectable with the primary fluid reservoir by dilation means; the primary piston comprising an outer piston slidable in the bore, and a central piston slidable in a piston bore defined by the outer piston, the piston bore having a shoulder engageable with an abutment face on the central piston to define a check valve, the piston bore providing a fluid passage between the high pressure chamber and the low pressure chamber of the primary portion, the check valve allowing hydraulic fluid to flow through the fluid passage during a rest mode or a release mode of the dual master cylinder, but preventing such flow during an apply mode.

In the present invention, the check valve performs the function of the previously known dilation port for the primary portion, and also provides a means for compensating for any reduction of hydraulic fluid in the high pressure chamber in the primary portion. By removing the previously known dilation port from the primary portion, potential damage of the seal on the primary piston is removed.

The seal on the primary piston is preferably an elastomeric cup seal. In this case, both the elastomeric cup seal and the check valve can provide the compensating effect. The seal on the secondary piston is preferably an elastomeric cup seal.

Preferably, the check valve comprises an elastomeric ring seal positioned between the abutment face and the shoulder. The elastomeric ring seal is preferably a metal washer having an elastomeric ring bonded to its inner circumference. Alternatively, the elastomeric ring seal may comprise an elastomeric ring positioned in, and protruding from, a groove in the abutment face or the shoulder. As a further alternative, the elastomeric ring seal may comprise an elastomeric ring bonded to the abutment face or the shoulder. As a still further alternative, the elastomeric ring seal may comprise an elastomeric ring positioned in, and protruding from, a circumferentially extending groove in the central piston adjacent the abutment face. In this latter case, the shoulder preferably includes abutment means engageable by the abutment face to prevent over-compression of the elastomeric ring.

Preferably, the piston bore comprises a small diameter portion which opens into the high pressure chamber of the primary portion and a large diameter portion, the shoulder being positioned between the large diameter portion and the small diameter portion; an aperture extends through the outer piston between the large diameter portion and the low pressure chamber of the primary portion; and the central piston comprises a main body slidably positioned within the large diameter portion of the piston bore, and a secondary body slidably positioned in the small diameter portion of the piston bore, the abutment face being positioned between the main body and the secondary body, the secondary body having a channel in its surface; the fluid passage being defined by the aperture, the large diameter portion, and the channel. In this case, the axial length of the secondary body is preferably greater than the axial length of the small diameter portion by a predetermined amount to define the maximum separation of the abutment face and the shoulder.

The central piston preferably has a shaped end to receive a pushrod.

Preferably, where the seal on the secondary piston is an elastomeric cup seal, the dilation means in the secondary portion is a dilation port. Alternatively, the dilation means may be a check valve means.

The present invention will now be described, by way of example, with reference to the accompanying drawings, in which.

Figure 1:
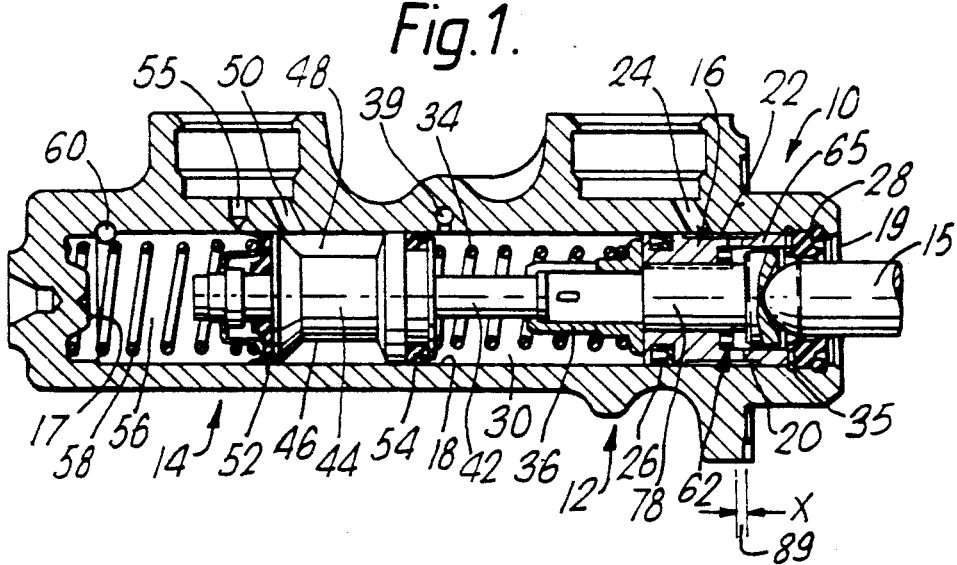
FIG. 1 is a cross-sectional view of a dual master cylinder in accordance with the present invention with the various components in the rest mode.
Figure 2:
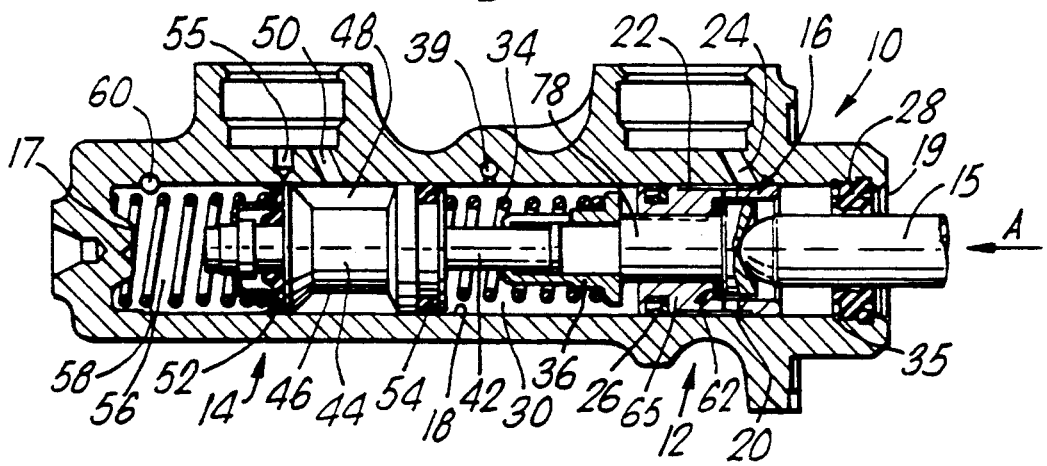
FIG. 2 is a cross-sectional view of the dual master cylinder of FIG. 1 with the various components in the applied mode.
Figure 3:
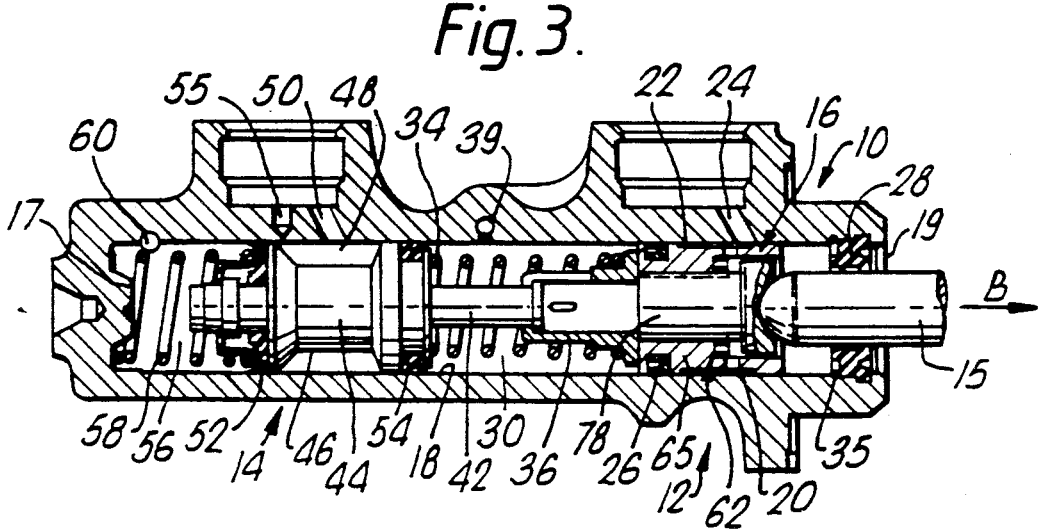
FIG. 3 is a cross-sectional view of the dual master cylinder of FIG. 1 with the various components in the release mode.
Figure 4:
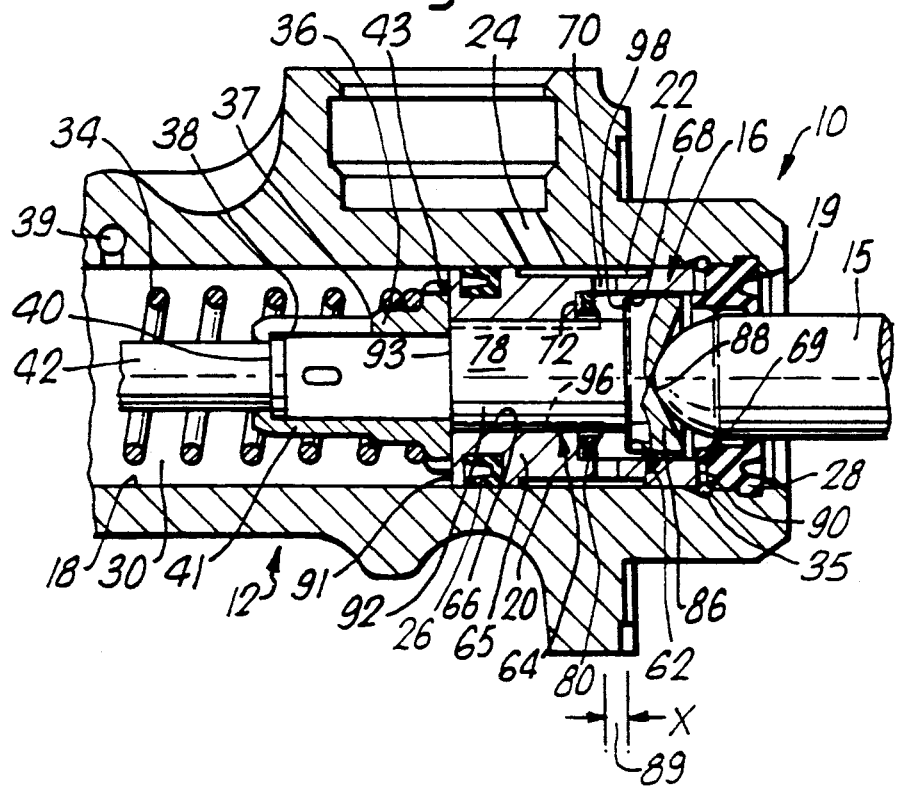
Figure 5:
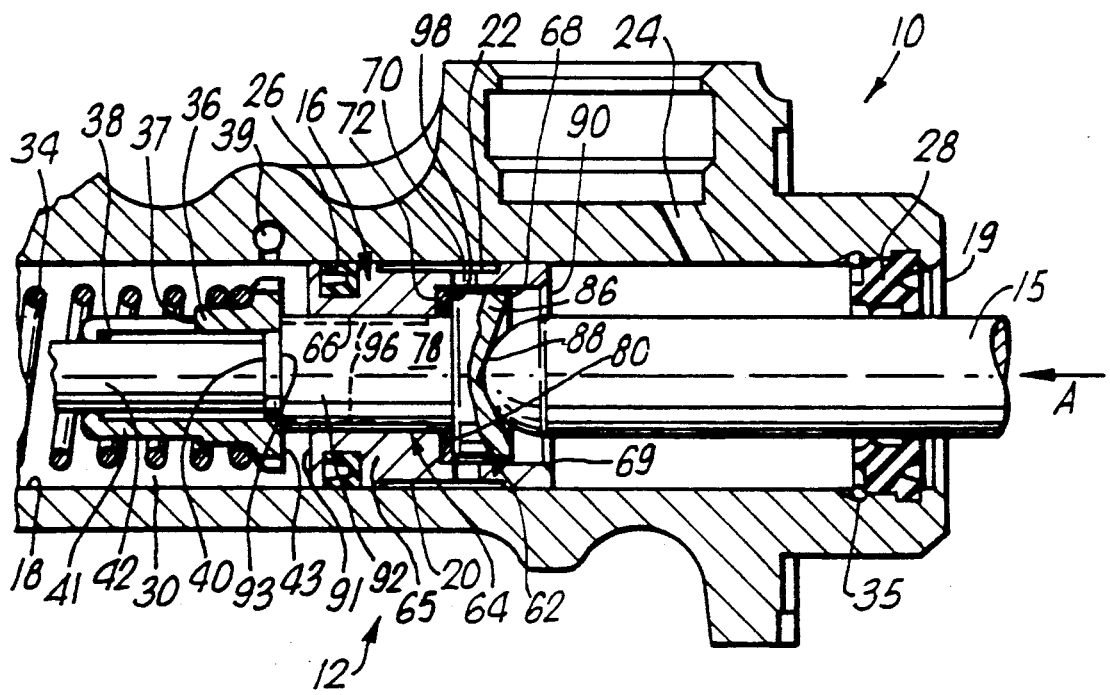

FIGS. 4, 5, and 6 are enlarged cross-sectional views of part of the dual master cylinder shown in FIGS. 1, 2, and 3 respectively, with the primary piston in the rest, apply, and release modes, respectively;

FIG. 7 is a cross-sectional view of the elastomeric ring seal shown in FIGS. 1 to 6;

FIG. 8 is a cross-sectional view of an alternative embodiment of primary piston for use in a dual master cylinder in accordance with the present invention; and FIG. 9 is a cross-sectional view of a further alternative embodiment of primary piston for use in a dual master cylinder in accordance with the present invention.

Referring to FIGS. 1 to 4, the dual master cylinder 10 comprises a primary portion 12 and a secondary portion 14. The primary portion 12 is connected to, and is part of, a primary circuit of the braking system of a motor vehicle. Similarly, the secondary portion 14 is connected to, and is part of, the secondary circuit of the braking system.

The primary portion 12 comprises a primary piston 16 axially slidable within a bore 18 having a closed end 17 and an open end 19 in the dual master cylinder 10, and movable by a pushrod 15 actuated by the vehicle operator by pressing on the brake pedal (not shown) of the braking system. The pushrod 15 passes through the open end 19 of the bore 18 to act on the primary piston 16. The primary piston 16 has a reduced diameter portion 20 between its ends to define a low pressure chamber 22 within the bore 18 for the primary portion 12. The primary portion 12 also includes a high pressure chamber 30 within the bore 18. The low pressure chamber 22 is connected to a primary fluid reservoir (not shown) by way of a compensation port 24. An elastomeric cup seal 26 which moves with the primary piston 16 allows hydraulic fluid to flow from the low pressure chamber 22 to the high pressure chamber 30 to compensate for pressure differentials between the low and high pressure chambers 22,30 respectively, on return movement of the primary piston 16 (after application of the brakes), and for brake pad or shoe wear. The elastomeric cup seal 26, however, prevents flow of hydraulic fluid from the high pressure chamber 30 back to the low pressure chamber 22. A ring stop 35 mounted in the bore 18 adjacent the open end 19 retains the primary piston 16 within the bore. An elastomeric cup seal 28 positioned between the ring stop 35 and the open end 19 provides a fluid tight seal between the pushrod 15 and the bore 18 of the dual master cylinder 10. A spring retainer cage 36 is mounted within the high pressure chamber 30. A number of resilient fingers 41 extend away from one end 37 of the spring retainer cage 36, each of which has a lip 38 engageable with a shoulder 40 on an extended portion 42 of a secondary piston 44 (described in more detail below). The lips 38 on the resilient fingers 41 make a snap fit over the shoulder 40 on the extended portion 42 to secure the spring retainer cage 36 to the secondary piston 44, but to allow the spring retainer cage to slide along the extended portion 42. A primary spring 34 is precompressed and positioned between the secondary piston 44 and the spring retainer cage 36. The primary spring 34 biases the other end 43 of the spring retainer cage 36 into engagement with the primary piston 16. This arrangement is such that, in the rest mode, the primary spring 34 holds the primary and secondary pistons 16,44 respectively at a predetermined maximum separation. An outlet port 39 connects the high pressure chamber 30 with the other components (not shown) of the primary circuit of the braking system.

The secondary portion 14 comprises the secondary piston 44, the extended portion 42 of which extends into the high pressure chamber 30 of the primary portion 12. The secondary piston 44 is also slidably mounted in the bore 18 (such that it is axially aligned with the primary piston 16), and has a reduced diameter portion 46 between its ends defining a low pressure chamber 48 within the bore 18 for the secondary portion 14. A compensation port 50 connects the low pressure chamber 48 with a secondary fluid reservoir (not shown). The secondary portion 14 also includes a high pressure chamber 56 within the bore 18. Elastomeric cup seals 52,54 are mounted on the secondary piston 44 to move therewith. One of the elastomeric cup seals 52 allows hydraulic fluid to flow from the low pressure chamber 48 to the high pressure chamber 56, but not in the reverse direction, to compensate for pressure differentials between the low and high pressure chambers 48,56 respectively, on return movement of the secondary piston 44 (after application of the brakes), and for brake pad or shoe wear. Similarly, the other elastomeric cup seal 54 allows hydraulic fluid to flow from the low pressure chamber 48 to the high pressure chamber 30 of the primary portion 12, but not in the reverse direction. The high pressure chamber 56 is connected to the secondary fluid reservoir by way of a dilation port 55 in a rest mode of the secondary piston 44, that is, when the brake pedal is not depressed. The dilation port 55 allows excess hydraulic fluid (generated by thermal expansion, etc.) to flow back to the secondary fluid reservoir to ensure there is no residual fluid pressure in the high pressure chamber 56. A secondary spring 58 is positioned within the high pressure chamber 56 and acts on the secondary piston 44 to bias an assembly of the secondary piston, primary spring 34, spring retainer cage 36, and primary piston 16 towards the open end 19 of the bore 18. The primary piston 16 engages the ring stop 35 in the rest mode to retain the assembly in the bore 18. The primary spring 34 is stronger than (usually of the order of twice as strong) the secondary spring 58 to ensure the whole assembly moves together on initial application of the vehicle brakes, as described below. An outlet port 60 in the high pressure chamber 56 provides a fluid connection with the other components of the secondary circuit.

The dual master cylinder 10 as thus far described is known. When the brake pedal (not shown) is depressed to apply the vehicle brakes, the pushrod 15 acts on the primary piston 16 to move the primary piston, the spring retainer cage 36, and, due to the primary spring 34 being stronger than the secondary spring 58, the secondary piston 44 relative to the bore 18 away from the open end 19 against the action of the secondary spring. Such movement of the secondary piston 44 isolates the dilation port 55 from the high pressure chamber 56, and pressurizes the hydraulic fluid in the high pressure chamber 56 to apply the vehicle brakes by way of the secondary circuit. Further, such movement of the primary piston 16 pressurizes the hydraulic fluid in the high pressure chamber 30 to apply the vehicle brakes by way of the primary circuit. Release of the brake pedal causes the above movement to be reversed. However, the biasing effect of the secondary spring 58 is such that the secondary and primary pistons 44,16 respectively may move back quicker than the returning hydraulic fluid. To compensate for the 'shortfall' in hydraulic fluid in the high pressure chambers 30,56, hydraulic fluid flows past the elastomeric cup seals 26,52 respectively from the low pressure chambers 22,48 respectively. Similarly, any shortfall of hydraulic fluid in the high pressure chambers 30,56 due to wear of the brake pads or brake shoes can be compensated for in this way. Any build up in fluid pressure in the high pressure chamber 56 (due to thermal expansion etc.) when the dual master cylinder 10 is in the rest mode is dilated to the secondary fluid reservoir by way of the dilation port 55.

In accordance with the present invention, the primary portion 12 also includes a check valve 62 (FIGS. 1 and 4). The check valve 62 is defined by the primary piston which is split into a central piston 78 and an outer piston 65. The central piston 78 is positioned within a piston bore 64 in the outer piston 65. The piston bore 64 comprises a small diameter portion 66 which opens into the high pressure chamber 30, and a large diameter portion 68 which opens at one end into the small diameter portion 66, and which is connected to the low pressure chamber 22 by way of an aperture 70 through the outer piston 65. A shoulder 72 connects the small diameter portion 66 with the large diameter portion 68 at said one end of the large diameter portion. The other end 69 of the large diameter portion 68 is open and directed towards the open end 19 of the bore 18. The central piston 78 comprises a main body 86 slidable within the large diameter portion 68 of the piston bore 64, and having a shaped portion 88 at one end which receives the pushrod 15, and a secondary body 92 extending from the other end of the main body, and making a sliding fit in the small diameter portion 66 of the piston bore. The axial length of the secondary body 92 is greater than the axial length of the small diameter portion 66 of the piston bore 64. The secondary body 92 has an end face 93 directed towards and in engagement with the said other end 43 of the spring retainer cage 36. The secondary body 92 also has at least one channel 96 extending along its surface. The outer piston 65 has one end 90 engageable with the ring stop 35, and the other end 91 engageable with said other end 43 of the spring retainer cage 36. An abutment face 98 is defined on the central piston 78 where the secondary body 92 meets the main body 86 which is directed towards the shoulder 72 defined by the piston bore 64. An elastomeric ring seal 80 is positioned around the secondary body 92 between the shoulder 72 and the abutment face 98. The elastomeric ring seal 80 (FIG. 7) comprises a steel washer 82 having an elastomeric ring 84 bonded to its inner circumference. The check valve 62 thereby comprises the central piston 78, the elastomeric ring seal 80, and the outer piston 65.

In the rest position shown in FIGS. 1 and 4, the central and outer pistons 78,65 respectively are biased towards the open end 19 of the bore 18 by the secondary spring 58. However, the outer piston 65 engages the ring stop 35 and the lips 38 on the resilient fingers 41 engage the shoulder 40 on the extended portion 42 due to the bias of the primary spring 34, to leave the end face 93 of the central piston 78 substantially aligned with the said other end 91 of the outer piston 65. As a consequence, the secondary body 92 projects into the large diameter portion 68 of the piston bore 64, and a gap 89 having a predetermined size X exists between the abutment face 98 on the central piston 78 and the shoulder 72 defined by the piston bore 64. Hydraulic fluid can therefore flow between the primary fluid reservoir and the high pressure chamber 30 by way of compensation port 24, low pressure chamber 22, aperture 70, the large diameter portion 68 of the piston bore 64, and channel(s) 96. Aperture 70, channel(s) 96, and large diameter portion 68 thereby define a fluid passage between the low pressure chamber 22 and the high pressure chamber 30.

When the brake pedal (not shown) is depressed (to apply the vehicle brakes), pushrod 15 moves in the direction A (FIGS. 2 and 5) to move the central piston 78 in the same direction, that is, away from the open end 19, to compress the secondary spring 58 (due to the primary spring 34 acting on the secondary piston 44) due to the engagement of the end face 93 of the secondary body 92 on the said other end 43 of the spring retainer cage 36. However, due to the resistance of the hydraulic fluid in the high pressure chamber 30 and the frictional effects of the elastomeric cup seal 26, the outer piston 65 does not move relative to the open end 19 of the bore 18. When the central piston 78 has moved a distance X equal to the gap 89, the elastomeric ring seal 80 engages both the abutment face 98 on the central piston 78 and the shoulder 72 in the piston bore 64.

Further movement of the central piston 78 in the same direction A compresses the elastomeric ring 84 to form a fluid tight seal between the abutment face 98 and the shoulder 72, and hence seals the fluid passage 70,96,68. Still further movement of the central piston 78 towards the closed end 17 pressurizes the hydraulic fluid in the high pressure chamber 56 to apply the vehicle brakes by way of the secondary circuit, and pressurizes the hydraulic fluid in the high pressure chamber 30 to apply the vehicle brakes by way of the primary circuit During this action, the steel washer 82 of the elastomeric ring seal 80 engages the abutment face 98 and the shoulder 72 to prevent over-compression of the elastomeric ring 84 (to prevent damaging it), and to move the central piston 78 and the outer piston 65 together. Continued movement of the central piston 78 in the direction A begins to compress the primary spring 34 until the end face 93 of the central piston engages the extended portion 42 of the secondary piston 44.

When the braking effort is released (FIGS. 3 and 6), the pressure of the hydraulic fluid and the bias of the secondary spring 58 act on the outer piston 65 and the central piston 78 to move them back in the direction B (opposite to direction A) to the rest position shown in FIGS. 1 and 4. However, as the primary spring 34 initially only exerts a biasing (return) force on the central piston 78, the central piston may move in the direction B quicker than the outer piston 65. As a consequence, the gap 89 between the abutment face 98 and the shoulder 72 begins to reopen until the said other end 43 of the spring retainer cage 36 engages the said other end 91 of the outer piston 65, at which point the outer piston and the central piston 78 move back together, and the gap 89 returns to its predetermined size X. The outer piston 65 and the central piston 78 then continue to move back until the outer piston 65 engages the ring stop 35.

The biasing effect of the secondary spring 58 is such that the primary piston 16 may move back quicker than the returning hydraulic fluid. The early reopening of the gap 89 allows hydraulic fluid to flow from the low pressure chamber 22 into the high pressure chamber 30 to compensate for this initial shortfall or lack of hydraulic fluid in the high pressure chamber Further, the gap 89 allows passage of hydraulic fluid from the primary fluid reservoir into the high pressure chamber 30 to compensate for a shortfall of hydraulic fluid in the high pressure chamber 30 due to wear of the brake pads or brake shoes. This compensating effect enhances the same effects provided by the elastomeric cup seal 26. Further still, the gap 89 allows reverse flow (dilation) of hydraulic fluid should there be an unintentional build up of fluid pressure in the high pressure chamber 30 due to thermal expansion, etc. The gap 89 therefore fulfills the same purpose as the dilation port 55 of the secondary portion 14, and no such port is required in the primary portion 12. Where the braking system includes ABS, when ABS operates a flow of hydraulic fluid is sent back to the high pressure chamber 30 increasing the fluid pressure therein. As no dilation port is present in the primary portion 12, no damage can occur to the elastomeric cup seal 26.

As well as overcoming the problems associated with prior known dual master cylinders, the present invention has the additional advantage that all of the components within the bore 18 of the dual master cylinder 10 can be assembled as a complete sub-assembly prior to insertion in the bore, and can be inserted in any orientation as there is no requirement to align it with a component inserted through the housing of the dual master cylinder (which also means there is no possibility of fluid leakage around such a component). Further still, the check valve arrangement can be incorporated into the dual master cylinder without any increase in its length, and the arrangement is very simple.

An alternative embodiment of primary piston 16' and check valve 62' is shown in FIG. 8. In this case, the outer piston 65 and the central piston 78' are substantially as described above. However, in this case, the elastomeric ring seal 100 comprises an elastomeric ring 102 which is positioned in, and protrudes from, a groove 104 in the shoulder 72' between the large diameter portion 68' and the small diameter portion 66' of the piston bore 64'. The elastomeric ring 102 may be bonded in position in the groove 104. Alternatively, the elastomeric ring may be positioned in, and protrude from, a groove in the abutment face 98' of the central piston. As a further alternative, the elastomeric ring may be simply bonded to the surface of the shoulder or the abutment face.

A further alternative embodiment of primary piston 16" and check valve 62" is shown in FIG. 9. In this case, the outer piston 65" and the central piston 78" are substantially as described above. However, in this case, the elastomeric ring seal 110 comprises an elastomeric seal 112 which is positioned in, and protrudes from, a circumferentially extending groove 114 in the secondary body 92" adjacent the abutment face 98". The elastomeric ring 112 may be bonded in position in the circumferentially extending groove 114. In this case, the shoulder 72" between the large diameter portion 68" and the small diameter portion 66" of the piston 64" preferably includes a step 116 to define abutment means During the apply mode of the dual master cylinder, the abutment face 98" engages the abutment means to prevent overcompression of the elastomeric ring 112.

Whilst the present invention has been described in regard to a dual master cylinder having a check valve in the primary portion only, a check valve may also be positioned in the secondary portion 14 to replace the dilation port 55. This check valve may be a suitably modified version of the above described check valve. Preferably, however, this check valve is as described either in our other patent application no. Ref: MJD/467), or as described in our patent application no. (Ref: MJD/469), both filed the same day as the present application.

I claim:

1. A dual master cylinder for the braking system of a motor vehicle comprising a bore having an open end and a closed end;
   a primary portion including a primary piston slidable in the bore, a low pressure chamber within the bore and defined by the shape of the primary piston, and a compensation port opening into the low pressure chamber and connectable with a primary fluid reservoir;
   and a secondary portion including a secondary piston slidable in the bore, a low pressure chamber within the bore and defined by the shape of the secondary piston, and a compensation port opening into the low pressure chamber and connectable with a secondary fluid reservoir;
   the primary portion including a high pressure chamber within the bore between the primary piston and the secondary piston, and the secondary portion including a high pressure chamber within the bore between the secondary piston and the closed end of the bore;

a seal being mounted on the primary piston between the low and high pressure chambers of the primary portion;

a seal being mounted on the secondary piston between the low and high pressure chambers of the secondary portion;

the high pressure chamber of the secondary portion being fluidly connectable with the secondary fluid reservoir by dilation means;

the primary piston comprising an outer piston slidable in the bore, and a central piston slidable in a piston bore defined by the outer piston, the piston bore having a shoulder engageable with an abutment face on the central piston to define a check valve, the piston bore providing a fluid passage between the high pressure chamber and the low pressure chamber of the primary portion, the check valve allowing hydraulic fluid to flow through the fluid passage during a rest mode or a release mode of the dual master cylinder, but preventing such flow during an apply mode, wherein an elastomeric ring seal is positioned between the abutment face and the shoulder; and wherein the piston bore comprises a small diameter portion which opens into the high pressure chamber of the primary portion and a large diameter portion, the shoulder being positioned between the large diameter portion and the small diameter portion; wherein an aperture extends through the outer piston between the large diameter portion and the low pressure chamber of the primary portion; and wherein the central piston comprises a main body slidably positioned within the large diameter portion of the piston bore, and a secondary body slidably positioned in the small diameter portion of the piston bore, the abutment face being positioned between the main body and the secondary body, the secondary body having a channel in its surface; the fluid passage being defined by the aperture, the large diameter portion, and the channel.

2. A dual master cylinder as claimed in claim 1, wherein the elastomeric ring seal is a metal washer having an elastomeric ring bonded to its inner circumference.

3. A dual master cylinder as claimed in claim 1, wherein the elastomeric ring seal comprises an elastomeric ring positioned in, and protruding from, a groove in the abutment face or in the shoulder.

4. A dual master cylinder as claimed in claim 1, wherein the elastomeric ring seal comprises an elastomeric ring bonded to the abutment face or to the shoulder.

5. A dual master cylinder as claimed in claim 1, wherein the elastomeric ring seal comprises an elastomeric ring positioned in, and protruding from, a circumferentially extending groove in the central piston adjacent the abutment face.

6. A dual master cylinder as claimed in claim 5, wherein the shoulder includes abutment means engageable by the abutment face to prevent over-compression of the elastomeric ring.

7. A dual master cylinder as claimed in claim 1, wherein the axial length of the secondary body is greater than the axial length of the small diameter portion by a predetermined amount to define the maximum separation of the abutment face and the shoulder.

8. A dual master cylinder as claimed in any one of claim 1, wherein the central piston has a shaped end to receive a pushrod.

9. A dual master cylinder as claimed in any one of claim 1, wherein the seal on the primary piston is an elastomeric cup seal.

10. A dual master cylinder as claimed in any one of claim 1, wherein the seal on the secondary piston is an elastomeric cup seal.

11. A dual master cylinder as claimed in claim 10, wherein the dilation means in the secondary portion is a dilation port.

12. A dual master cylinder as claimed in any one of claim 1, wherein the dilation means is a check valve means.

* * * * *